April 2, 1929.  C. A. KNAPP  1,707,228
CROSSHEAD
Filed Sept. 18, 1924
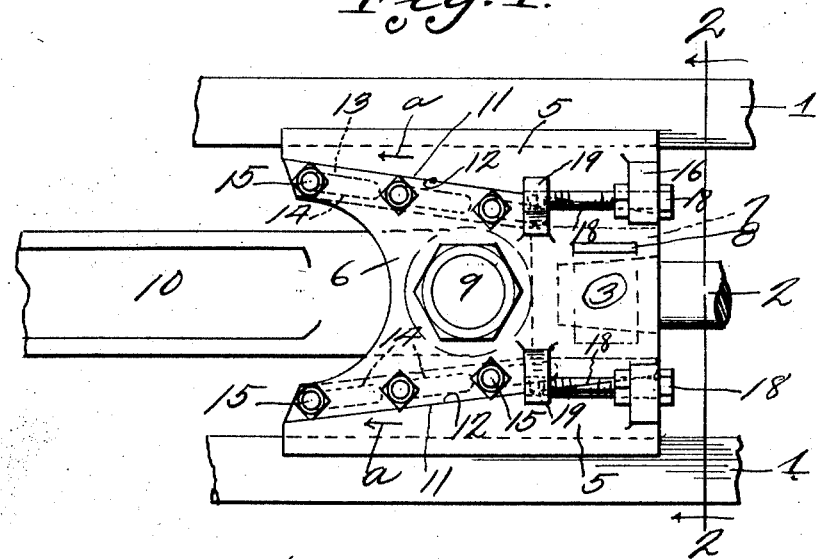
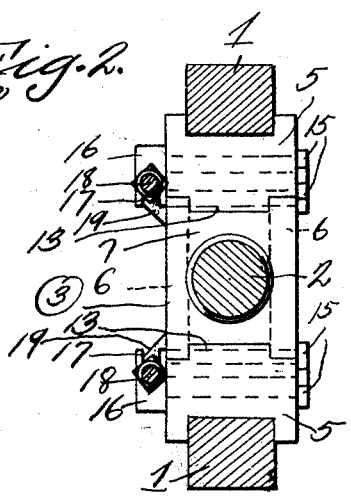
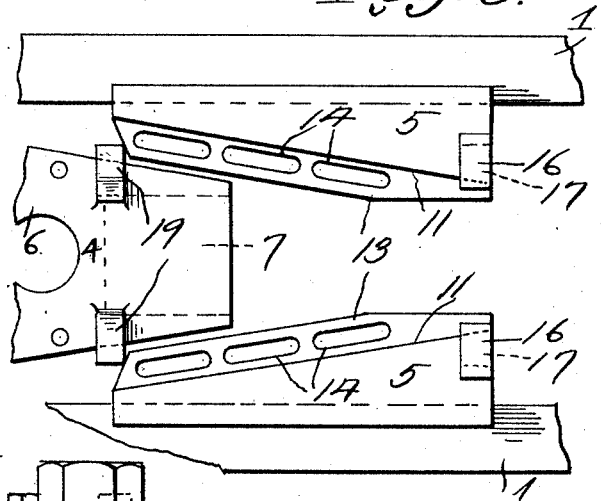

Patented Apr. 2, 1929.

1,707,228

UNITED STATES PATENT OFFICE.

CLYDE A. KNAPP, OF HARVEY, ILLINOIS.

CROSSHEAD.

Application filed September 18, 1924. Serial No. 738,497.

The invention relates to cross heads, particularly of the type used in connection with locomotives wherein the crosshead reciprocates in horizontally disposed crosshead guides, and has for its object to provide a device of this character comprising a wedge shaped body portion to which a piston rod is connected, and wedge shaped shoes carried by the upper and lower sides of the body member and provided with means whereby said shoes may be adjusted inwardly for taking up wear on the shoes and guides, thereby obviating the necessity of placing liners in the crosshead or removing the crosshead from the guide.

A further object is to provide the adjustable shoes with lugs which overlie the sides of the wedge shaped body member and the body member with lugs which overlie the adjustable shoes and adjusting bolts extending through said lugs of the shoes and wedge shaped body of the crosshead and forming means whereby the shoes may be forced longitudinally in relation to the crosshead body for taking up wear, and particularly what is known as vertical wear. Also to provide one of said lugs with an elongated slot through which the bolts extend thereby allowing vertical movement of the bolts during the adjusting operation.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the crosshead

Figure 2 is a section taken on line 2—2 of Fig. 1.

Figure 3 is a collective detail view of the parts.

Figure 4 is a top plan view of the crosshead showing the adjustable shoe removed.

Referring to the drawing, the numeral 1 designates spaced crosshead guides in parallel relation to each other, and which guides are of a conventional form, for instance of the type used on locomotives. It has been found that when the guides wear, or the crosshead wears, in a conventional form of device, the piston rod 2 is moved out of its proper axial alinement with its piston and cylinder, thereby reducing the efficiency of the engine, and at the same time wearing the packing glands out of round, which causes leakage, as well as inefficient operation. To obviate this difficulty the crosshead 3 is provided, which crosshead comprises the wedge shaped body portion 4 and the adjustable crosshead shoes 5. The body portion 4 comprises spaced plates 6 which are connected together adjacent one of their ends by the integral portion 7, and to which integral portion the piston rod 2 is connected by means of a diagonally extending key 8. Pivotally connected on the wrist pin 9 between the plates 6 is a conventional form of connecting rod 10, which operates in the usual manner.

Shoes 5 have their inner sides provided with inclined surfaces 11 which engage the inclined surfaces 12 of the body member 4, therefore it will be seen that as wear developes on the guide 1 or the shoes 5, said wear may be taken up by adjusting the shoes 5 in the direction of the arrows $a$ and if said shoes are adjusted the same distance the wear may be taken up without interfering with the alinement of the piston rod 2. Extending downwardly from the inner sides 11 of the shoes 5 are flanges 13, which are disposed between the plates 6, and provided with elongated apertures 14, through which the bolts 15 which extend through the plate 6 extend, and which bolts when tightened clamp the flanges 13 between the plates 6, thereby additionally holding the same against movement after an adjusting operation. Extending outwardly from the outer sides of the shoes 5 adjacent their wide ends are integral lugs 16, which lugs overlie the outer face of the body member 4 of the cross head, and are provided with vertically disposed elongated recesses 17 through which the securing bolts 18 extend. Bolts 18 are threaded through lugs 19 carried by opposite sides of the body 4 and which lugs overlie the other faces of the shoes 5. It will be seen that when the bolts 18 are adjusted the wedge shaped crosshead shoes 5 may be forced in the direction of the arrows $a$ for taking up wear thereon or on the guides, and by providing the elongated recesses 17 the shoes 5 may have freedom of movement in a vertical plane during the adjusting operation without a side bending strain on the bolts. Lugs 16 and 19 also form guiding means for guiding the shoes during the adjustment thereof.

From the above it will be seen that an adjustable crosshead is provided whereby the wear on the crosshead or guides may be easily and quickly taken up without throwing the piston rod out of alinement, and said piston rod, if out of alinement, may be easily and quickly adjusted and adjusted to alined position.

The invention having been set forth what is claimed as new and useful is:—

A crosshead comprising a wedge shaped body member having opposite surfaces each inclined throughout the entire length of the wedge shaped body member, take-up shoes longitudinally adjustable along each of the inclined surfaces of the body member and having surfaces inclined from end to end and co-operable with the inclined surfaces of the body member and adapted to be initially disposed substantially coincident therewith, a piston rod connected to the wedge shaped body member and extending from one end, a connecting rod connected to the opposite end of said body member and swingable with respect thereto the inclined surfaces diverging from the piston rod and to the connecting rod of the crosshead, a pair of lugs extending laterally from the body member adjacent its inclined surfaces, said lugs being disposed between the ends of the inclined surfaces of the body member, laterally extending lugs on the take-up shoes at the piston ends thereof, said last lugs being aligned longitudinally with said first lugs and disposed between the ends of the inclined surfaces of the take-up shoes, said shoes being initially disposed with a minimum of longitudinal end-wise extension from the body member and being adjustable from said minimum extension in taking up wear after use, and bolts co-operable with the lugs on the body member and with the lugs on said shoes and adjustable from the piston rod end of the body member to adjust the shoes longitudinally along the inclined surfaces thereof.

In testimony whereof I have signed my name to this specification.

CLYDE A. KNAPP.